(12) United States Patent
Wang

(10) Patent No.: US 12,032,414 B2
(45) Date of Patent: Jul. 9, 2024

(54) SUPPORT PLATE AND DISPLAY DEVICE

(71) Applicant: Wuhan China Star Optoelectronics Semiconductor Display Technology Co., Ltd., Wuhan (CN)

(72) Inventor: Wenqiang Wang, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/760,879

(22) PCT Filed: Feb. 22, 2022

(86) PCT No.: PCT/CN2022/077273
§ 371 (c)(1),
(2) Date: Mar. 16, 2022

(87) PCT Pub. No.: WO2023/151123
PCT Pub. Date: Aug. 17, 2023

(65) Prior Publication Data
US 2024/0061473 A1 Feb. 22, 2024

(30) Foreign Application Priority Data
Feb. 8, 2022 (CN) .......................... 202210120595.9

(51) Int. Cl.
*G06F 1/16* (2006.01)
(52) U.S. Cl.
CPC .......... *G06F 1/1656* (2013.01); *G06F 1/1652* (2013.01)
(58) Field of Classification Search
CPC .... G06F 1/1601; G06F 1/1613; G06F 1/1626; G06F 1/1633; G06F 1/1656
See application file for complete search history.

(56) References Cited

U.S. PATENT DOCUMENTS

| 11,094,895 B2* | 8/2021 | Dai | ...................... H10K 59/179 |
| 2021/0375948 A1* | 12/2021 | Ye | .......................... H01L 27/124 |
| 2023/0239558 A1* | 7/2023 | Hill | ....................... G06F 1/1635 |
| | | | 348/371 |

FOREIGN PATENT DOCUMENTS

| CN | 106486491 A | 3/2017 |
| CN | 108766977 A | 11/2018 |

(Continued)

OTHER PUBLICATIONS

«Science and Technology Review» Issue 17 Sep. 13, 2017 Yuan Wei, ETC. Fabrication of stretchable circuit with high resolution linewidth and complex pattern via printing method on silicone substrate pp. 75-81.

(Continued)

*Primary Examiner* — Anthony Q Edwards
(74) *Attorney, Agent, or Firm* — Nathan & Associates; Menachem Nathan

(57) ABSTRACT

The present application provides a support plate and a display device. The support plate is provided with a hollow hole for providing an external module and a plurality of openings. The support plate is provided with a first region and a second region, wherein the plurality of openings are arranged in the first region, the first region is arranged on at least one side of the hollow hole, and the second region is arranged on at least one side of the first region away from the hollow hole. A rigidity of a portion of the support plate corresponding to the first region is less than a rigidity of a portion of the support plate corresponding to the second region.

20 Claims, 5 Drawing Sheets

(56) References Cited

FOREIGN PATENT DOCUMENTS

| | | |
|---|---|---|
| CN | 108990336 A | 12/2018 |
| CN | 109671864 A | 4/2019 |
| CN | 109686267 A | 4/2019 |
| CN | 109712527 A | 5/2019 |
| CN | 109860253 A | 6/2019 |
| CN | 110741105 A | 1/2020 |
| CN | 110992828 A | 4/2020 |
| CN | 111403624 A | 7/2020 |
| CN | 111627930 A | 9/2020 |
| CN | 111833751 A | 10/2020 |
| CN | 112002248 A | 11/2020 |
| CN | 112053632 A | 12/2020 |
| CN | 112086025 A | 12/2020 |
| CN | 112242094 A | 1/2021 |
| CN | 112289840 A | 1/2021 |
| CN | 112396956 A | 2/2021 |
| CN | 112599023 A | 4/2021 |
| CN | 113035913 A | 6/2021 |
| CN | 113241363 A | 8/2021 |
| CN | 113257116 A | 8/2021 |
| CN | 214042900 U | 8/2021 |
| CN | 113629120 A | 11/2021 |
| CN | 113690292 A | 11/2021 |
| CN | 113746958 A | 12/2021 |
| JP | 2010117643 A | 5/2010 |
| JP | 2012073378 A | 4/2012 |
| WO | 2021177697 A1 | 9/2021 |
| WO | 2021249442 A1 | 12/2021 |

OTHER PUBLICATIONS

International Search Report in International application No. PCT/CN2022/077273, mailed on Nov. 9, 2022.
Written Opinion of the International Search Authority in International application No. PCT/CN2022/077273, mailed on Nov. 9, 2022.
Chinese Office Action issued in corresponding Chinese Patent Application No. 202210120595.9 dated Sep. 30, 2022, pp. 1-9.
Chinese Office Action issued in corresponding Chinese Patent Application No. 202210120595.9 dated Apr. 12, 2023, pp. 1-9.

* cited by examiner

SUPPORT PLATE AND DISPLAY DEVICE

TECHNICAL FIELD

The present application relates to a technical field of display, and in particular, to a support plate and a display device.

BACKGROUND

With the development of organic light-emitting diode (OLED) technology, consumers' demand for a high screen-ratio is increasing. As a result, in order to maximize the proportion of OLED display screens, research focus in the display field has shifted from traditional 2D planar screens to 3D bending OLEDs. However, due to limitation of current module processing capabilities, yield of bending high screen-ratio OLED screens has been unable to meet the design requirements. The main reason is that in the process of three-dimensional bonding of modules, uneven stress on an interface between module materials will easily lead to debonding between a device layer and a material layer, which greatly affects the improvement of yield. In addition, due to development requirements of under-display fingerprints, openings corresponding to fingerprint sensing are often designed in a module stack. Existence of the openings destroys the flatness of an entire surface of an existing module support layer, and imprints will be formed around the openings due to a top pressure of the fixture equipment during bonding. Existence of the imprints will result in poor display on a surface of a screen, such as afterimage, uneven hue, dark lines, and black spots. Therefore, it is an urgent process problem to effectively solve a problem of improving a bonding yield of bending edges and reducing an imprint phenomenon around the openings in the three-dimensional bonding process of OLED bending screen.

Technical Problem

An embodiment of the present application provides a support plate and a display device, which can reduce a risk of imprints around hollow holes on the support plate during module compression.

Technical Solution

An embodiment of the application provides a support plate, which is provided with a hollow hole for providing an external module and a plurality of openings;
- the support plate is provided with a first region and a second region, the plurality of openings are arranged in the first region, the first region is arranged on at least one side of the hollow hole, and the second region is arranged on at least one side of the first region away from the hollow hole; and
- a rigidity of a portion of the support plate corresponding to the first region is less than a rigidity of a portion of the support plate corresponding to the second region.

Optionally, in some embodiments of the present application, the first region comprises at least a straight edge region, and the straight edge region comprises a plurality of straight edge sub-regions; the plurality of straight edge sub-regions are arranged in sequence from an edge of the hollow hole in a direction away from the hollow hole, and rigidities of two adjacent straight-edge sub-regions increase gradually.

Optionally, in some embodiments of the present application, the plurality of openings comprise a first opening arranged in the straight edge sub-region, and a length direction of the first opening is an extension direction of the straight edge sub-region; from an edge of the hollow hole in a direction away from the hollow hole, in any two of the straight edge sub-regions, a length of the first opening in the straight edge sub-region close to the hollow hole is greater than a length of the first opening in the straight edge sub-region away from the hollow hole.

Optionally, in some embodiments of the present application, from an edge of the hollow hole in a direction away from the hollow hole, in any two of the straight edge sub-regions, a first spacing between the first openings in the straight edge sub-region close to the hollow hole is less than a first spacing between the first openings in the straight edge sub-region away from the hollow hole.

Optionally, in some embodiments of the present application, in a direction parallel to a circumference of the hollow hole, and the first openings of each of the straight edge sub-regions are arranged at intervals, and the first spacing is provided between two adjacent first openings; and
  wherein in any two of the straight edge sub-regions, the length of the first opening is equal to a sum of the first spacings.

Optionally, in some embodiments of the present application, the straight edge sub-region comprises at least a row of the first openings; from an edge of the hollow hole in a direction away from the hollow hole, one of the first openings in a certain row partially overlaps with two of the first openings in its adjacent row.

Optionally, in some embodiments of the present application, the first region comprises at least a bending region, and the bending region comprises a plurality of bending sub-regions; wherein in the first region, a plurality of the bending sub-regions are arranged in sequence from an edge of the hollow hole in a direction away from the hollow hole, and rigidities of two adjacent bending sub-regions increase gradually.

Optionally, in some embodiments of the present application, the plurality of openings comprise a second opening arranged in the bending sub-region, and an arc length direction of the second opening is an extension direction of the bending sub-region; wherein from an edge of the hollow hole in a direction away from the hollow hole, in any two of the straight edge sub-regions, an arc length of the second opening in the bending sub-region close to the hollow hole is greater than an arc length of the second opening in the bending sub-region away from the hollow hole.

Optionally, in some embodiments of the present application, the first region comprises at least a straight edge region, and the straight edge region comprises a plurality of straight edge sub-regions; the plurality of openings comprise a first opening arranged in the straight edge sub-region;
  the plurality of straight edge sub-regions are arranged in sequence from an edge of the hollow hole in a direction away from the hollow hole, and one of the straight edge sub-regions is correspondingly connected to one of the bending sub-regions;
  the plurality of openings comprise a third opening, and the third opening comprises a first portion and a second portion that are connected, and the first portion is arranged in the straight edge region and the second portion is arranged in the bending region; and
  an extension direction of the first portion coincides with an extension direction of the first opening in circumferential direction parallel to the hollow hole, and a radian direction of the second portion is parallel to a radian direction of the second opening.

Optionally, in some embodiments of the present application, the plurality of bending sub-regions are concentrically arranged, and a center angle of the plurality of bending sub-regions is 90 degrees; and a center line of the straight edge sub-region is tangent to a center line of the bending sub-region connected to the straight edge sub-region.

Optionally, in some embodiments of the present application, the support plate comprises a flat portion and a bending portion connected to at least one side of the flat portion, and the first region, the second region, and the hollow hole are arranged in the flat portion;

the support plate is further provided with a third region corresponding to the bending portion, the plurality of openings further comprise a fourth opening, and a plurality of the fourth openings are provided in the third region; and a rigidity of the bending portion of the support plate corresponding to the third region is less than a rigidity of the flat portion of the support plate corresponding to the second region.

Optionally, in some embodiments of the present application, the third region comprises a plurality of vertical sub-regions; and in the third region, a plurality of the vertical sub-regions are arranged in sequence from one side close to the second region to one side away from the second region, and rigidities of two adjacent vertical sub-regions decreases.

Optionally, in some embodiments of the present application, a length direction of the fourth opening is an extension direction of the third region; and in the third region, a length of the fourth opening increases from a side close to the second region to a side away from the second region.

Optionally, in some embodiments of the present application, in any two of the vertical sub-regions, a second spacing between the fourth openings in the vertical sub-regions close to the second region is greater than a second spacing between the fourth openings in the vertical sub-regions away from the second region from one side close to the second region to one side away from the second region.

Optionally, in some embodiments of the present application, a plurality of the vertical sub-regions are arranged in a first direction; in each of the vertical sub-regions, the fourth openings are arranged at intervals in a second direction; the first direction is a bending direction of the bending portion, and the second direction is perpendicular to the first direction; and in the second direction, the second spacing is arranged between two the adjacent fourth openings of the same vertical sub-region;

wherein, in any two of the vertical sub-regions, the length of the fourth opening is equal to a sum of the second spacings.

Optionally, in some embodiments of the present application, the vertical sub-region comprises at least a row of the fourth openings; and one of the fourth openings in a certain row partially overlaps two of the fourth openings in its adjacent row in the first direction.

Optionally, in some embodiments of the present application, the opening comprises two first side lines and two opposite second side lines, one of the first side lines is connected to one side of the two second side lines, and the first side lines are arcuate.

Correspondingly, an embodiment of the present application further provides a display device, comprising the support plate according to any of the above embodiments;

a buffer layer arranged on the support plate, wherein the buffer layer is provided with an opening corresponding to the hollow hole, and hole walls of the hollow hole are located on an outer peripheral side of the hole walls of the opening;

a colloid arranged on the buffer layer; and a display panel arranged on the colloid;

wherein the support plate is provided with a hollow hole for providing an external module and a plurality of openings; and wherein the support plate is provided with a first region and a second region, the plurality of openings are arranged in the first region, the first region is arranged on at least one side of the hollow hole, and the second region is arranged on at least one side of the first region away from the hollow hole.

Optionally, in some embodiments of the present application, the first region comprises at least a straight edge region, and the straight edge region comprises a plurality of straight edge sub-regions; the plurality of straight edge sub-regions are arranged in sequence from an edge of the hollow hole in a direction away from the hollow hole, and rigidities of two adjacent straight-edge sub-regions increase gradually.

Optionally, in some embodiments of the present application, the plurality of openings comprise a first opening arranged in the straight edge sub-region, and a length direction of the first opening is an extension direction of the straight edge sub-region; from an edge of the hollow hole in a direction away from the hollow hole, in any two of the straight edge sub-regions, a length of the first opening in the straight edge sub-region close to the hollow hole is greater than a length of the first opening in the straight edge sub-region away from the hollow hole.

Optionally, in some embodiments of the present application, from an edge of the hollow hole in a direction away from the hollow hole, in any two of the straight edge sub-regions, a first spacing between the first openings in the straight edge sub-region close to the hollow hole is less than a first spacing between the first openings in the straight edge sub-region away from the hollow hole.

Optionally, in some embodiments of the present application, in a direction parallel to a circumference of the hollow hole, and the first openings of each of the straight edge sub-regions are arranged at intervals, and the first spacing is provided between two adjacent first openings; and wherein in any two of the straight edge sub-regions, the length of the first opening is equal to a sum of the first spacings.

Optionally, in some embodiments of the present application, the straight edge sub-region comprises at least a row of the first openings; from an edge of the hollow hole in a direction away from the hollow hole, one of the first openings in a certain row partially overlaps with two of the first openings in its adjacent row.

Optionally, in some embodiments of the present application, the first region comprises at least a bending region, and the bending region comprises a plurality of bending sub-regions; wherein in the first region, a plurality of the bending sub-regions are arranged in sequence from an edge of the hollow hole in a direction away from the hollow hole, and rigidities of two adjacent bending sub-regions increase gradually.

Optionally, in some embodiments of the present application, the plurality of openings comprise a second opening arranged in the bending sub-region, and an arc length direction of the second opening is an extension direction of the bending sub-region; wherein from an edge of the hollow hole in a direction away from the hollow hole, in any two of the straight edge sub-regions, an arc length of the second opening in the bending sub-region close to the hollow hole is greater than an arc length of the second opening in the bending sub-region away from the hollow hole.

Optionally, in some embodiments of the present application, the first region comprises at least one straight edge region, and the straight edge region comprises a plurality of straight edge sub-regions; the plurality of openings comprise a first opening arranged in the straight edge sub-region;

the plurality of straight edge sub-regions are arranged in sequence from an edge of the hollow hole in a direction away from the hollow hole, and one of the straight edge sub-regions is correspondingly connected to one of the bending sub-regions;

the plurality of openings comprise a third opening, and the third opening comprises a first portion and a second portion that are connected, and the first portion is arranged in the straight edge region and the second portion is arranged in the bending region; and an extension direction of the first portion coincides with an extension direction of the first opening in circumferential direction parallel to the hollow hole, and a radian direction of the second portion is parallel to a radian direction of the second opening.

Optionally, in some embodiments of the present application, the plurality of bending sub-regions are concentrically arranged, and a center angle of the plurality of bending sub-regions is 90 degrees; and a center line of the straight edge sub-region is tangent to a center line of the bending sub-region connected to the straight edge sub-region.

Optionally, in some embodiments of the present application, the support plate comprises a flat portion and a bending portion connected to at least one side of the flat portion, and the first region, the second region, and the hollow hole are arranged in the flat portion;

the support plate is further provided with a third region corresponding to the bending portion, the plurality of openings further comprise a fourth opening, and a plurality of the fourth openings are provided in the third region; and a rigidity of the bending portion of the support plate corresponding to the third region is less than a rigidity of the flat portion of the support plate corresponding to the second region.

Optionally, in some embodiments of the present application, the third region comprises a plurality of vertical sub-regions; and in the third region, a plurality of the vertical sub-regions are arranged in sequence from one side close to the second region to one side away from the second region, and rigidities of two adjacent vertical sub-regions decreases.

Optionally, in some embodiments of the present application, a length direction of the fourth opening is an extension direction of the third region; and in the third region, a length of the fourth opening increases from a side close to the second region to a side away from the second region.

Optionally, in some embodiments of the present application, in any two of the vertical sub-regions, a second spacing between the fourth openings in the vertical sub-regions close to the second region is greater than a second spacing between the fourth openings in the vertical sub-regions away from the second region from one side close to the second region to one side away from the second region.

Optionally, in some embodiments of the present application, a plurality of the vertical sub-regions are arranged in a first direction; in each of the vertical sub-regions, the fourth openings are arranged at intervals in a second direction; the first direction is a bending direction of the bending portion, and the second direction is perpendicular to the first direction; and in the second direction, the second spacing is arranged between two the adjacent fourth openings of the same vertical sub-region;

wherein, in any two of the vertical sub-regions, the length of the fourth opening is equal to a sum of the second spacings.

Optionally, in some embodiments of the present application, the vertical sub-region comprises at least a row of the fourth openings; and one of the fourth openings in a certain row partially overlaps two of the fourth openings in its adjacent row in the first direction.

Optionally, in some embodiments of the present application, the opening comprises two first side lines and two opposite second side lines, one of the first side lines is connected to one side of the two second side lines, and the first side lines are arcuate.

Technical Effects

An embodiment of the present application provides a support plate and a display device, the support plate is provided with a hollow hole for providing an external module and a plurality of openings; the support plate is provided with a first region and a second region, the plurality of openings are arranged in the first region, the first region is arranged on at least one side of the hollow hole, and the second region is arranged on at least one side of the first region away from the hollow hole; and a rigidity of a portion of the support plate corresponding to the first region is less than a rigidity of a portion of the support plate corresponding to the second region.

Wherein, a first region having an opening is provided on at least one side of the hollow hole, and the rigidity of the first region is reduced by providing the opening, so that the stress release effect of the first region portion is improved during module compression, thereby reducing the risk of imprints around the hollow hole on the support plate.

BRIEF DESCRIPTION OF THE DRAWINGS

In order to more clearly describe the technical solutions in the embodiments of the present application, hereinafter, the appended drawings used for describing the embodiments will be briefly introduced. Apparently, the appended drawings described below are only directed to some embodiments of the present application, and for a person skilled in the art, without expenditure of creative labor, other drawings can be derived on the basis of these appended drawings.

DETAILED DESCRIPTION

Figure 1:
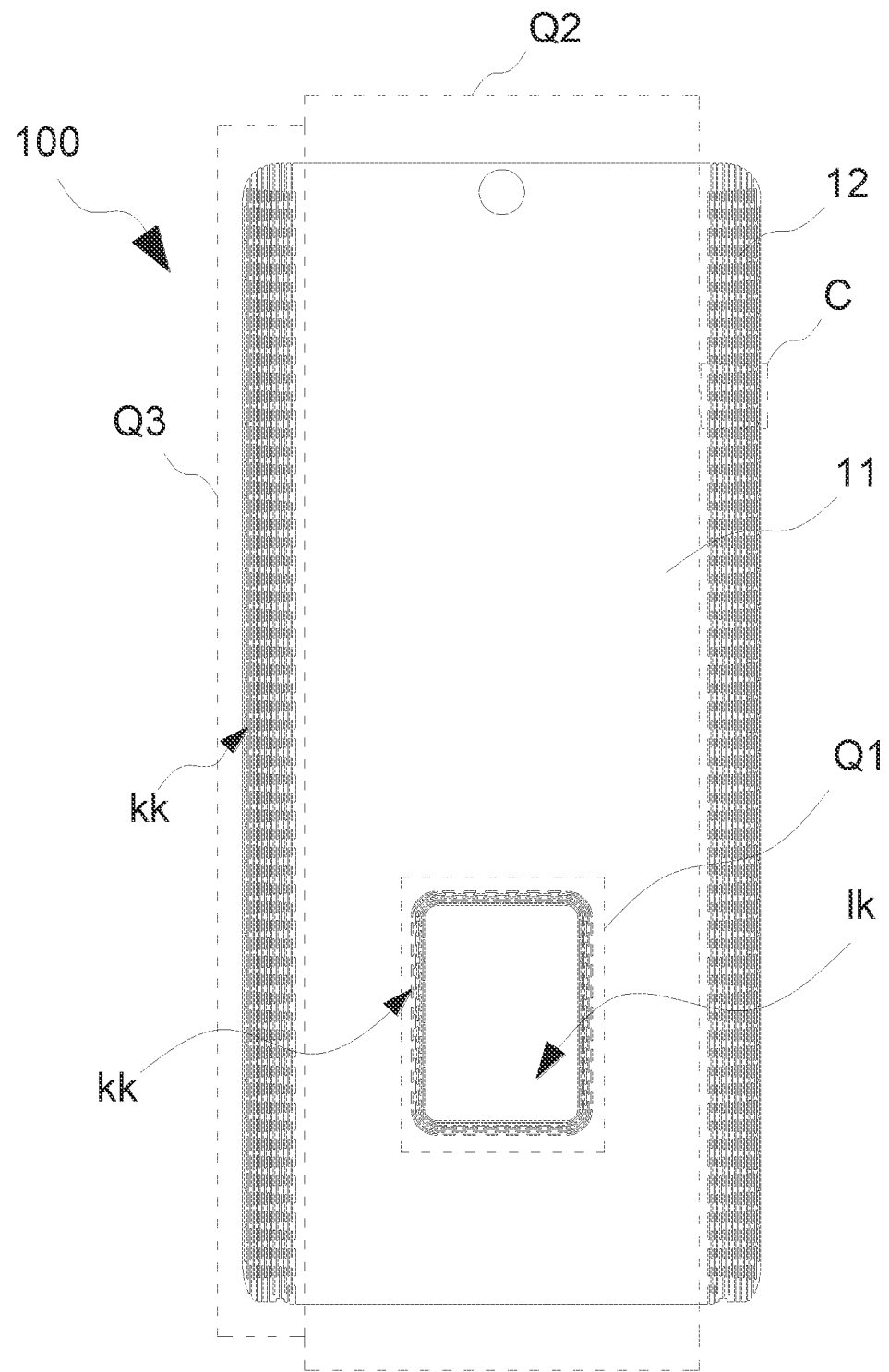
FIG. 1 is a schematic structural diagram of a support plate provided by an embodiment of the present application.

Hereinafter, technical solution in embodiments of the present application will be clearly and completely described with reference to the accompanying drawings in embodiments of the present application. Apparently, the described embodiments are part of, but not all of, the embodiments of the present application. All the other embodiments, obtained by a person with ordinary skill in the art on the basis of the embodiments in the present application without expenditure of creative labor, belong to the protection scope of the present application. In addition, it should be understood that the specific embodiments described herein are intended only to illustrate and explain the present application and are not intended to limit the present application. In the present application, in the absence of contrary description, directional words such as "up" and "down" generally refer to the up and down in the actual use or working state of a device, and specifically the drawing direction in the accompanying drawings. While "inside" and "outside" are for profile of the device.

An embodiment of the present application provides a support plate and a display device, which will be described in detail below. It should be noted that the description order of the following embodiments is not a limitation on the preferred order of the embodiments.

Figure 2:
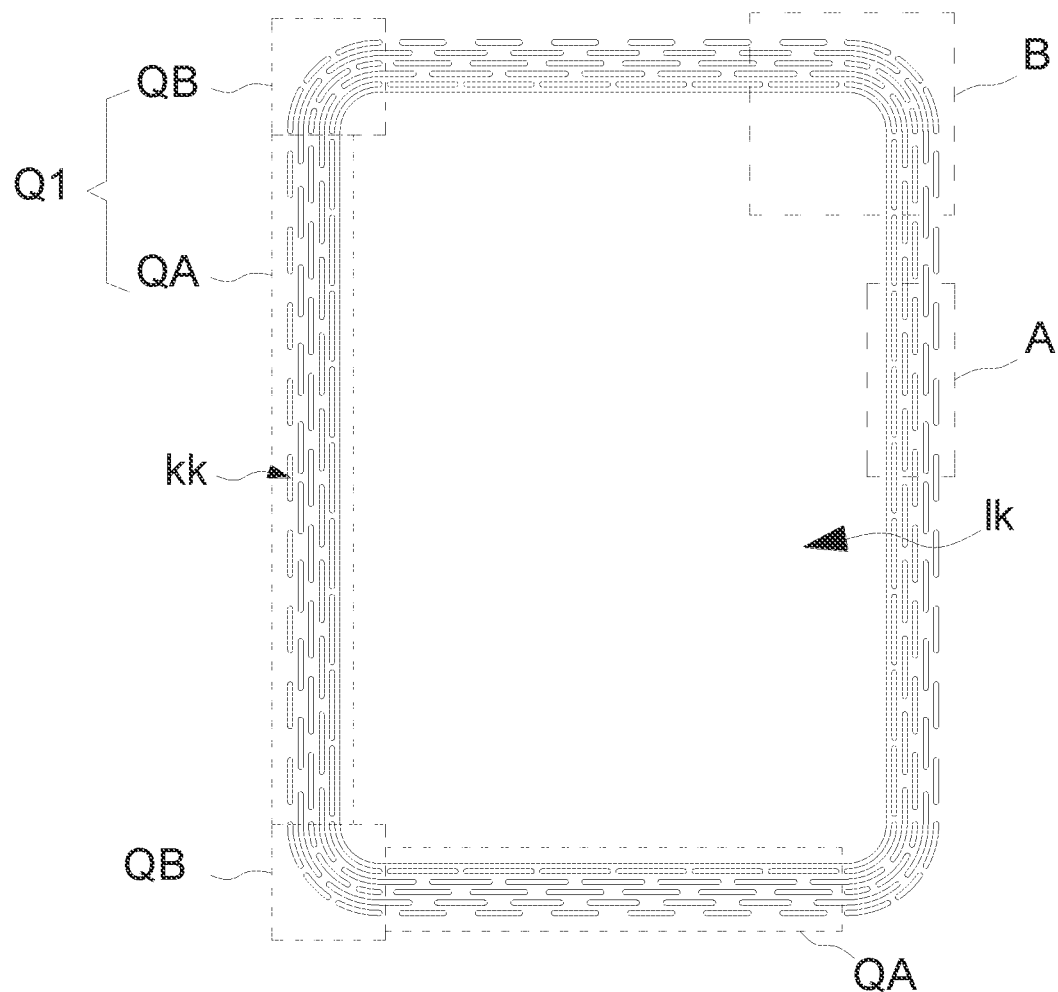
FIG. 2 is an enlarged view of a first region and openings in FIG. 1.

Referring to FIGS. 1-2, an embodiment of the present application provides a support plate 100. The support plate 100 is provided with a hollow hole lk for providing an external module and a plurality of openings kk.

The support plate 100 is provided with a first region Q1 and a second region Q2, the plurality of openings kk are arranged in the first region Q1, the first region Q1 is arranged on at least one side of the hollow hole lk, and the second region Q2 is arranged on at least one side of the first region Q1 away from the hollow hole lk.

A rigidity of a portion of the support plate 100 corresponding to the first region Q1 is less than a rigidity of a portion of the support plate 100 corresponding to the second region Q2.

In this embodiment, the first region Q1 having an opening kk is provided on at least one side of the hollow hole lk, and the rigidity of the first region Q1 is reduced by providing the opening kk, so that the stress release effect of the first region Q1 portion is improved during module compression, thereby reducing a risk of imprints around the hollow hole lk on the support plate 100.

It should be noted that the external module may be a camera module, a fingerprint recognition module, or other modules that need to be compressed with the support plate 100.

Optionally, in this embodiment, the first region Q1 surrounds a circumference of the hollow hole lk. The second region Q2 also surrounds a circumference of the first region Q1.

This arrangement makes it possible to reduce imprints around the hollow hole lk at the same time when compressing the module.

In some embodiments, the first region Q1 may also be arranged only on one side of the hollow hole lk; and the second region Q2 surrounds the first region Q1 and the hollow hole lk.

In some embodiments, the first region Q1 may also be arranged on both sides of the hollow hole lk; and the second region Q2 surrounds the first region Q1 and the hollow hole lk.

In some embodiments, the first region Q1 may also surround a portion of the hollow hole lk, such as three-fourths of a circumference of a hole wall surrounding the hollow hole lk; and the second region Q2 surrounds a portion of the first region Q1, such as three-fourths of a circumference of the hole wall surrounding the hollow hole lk.

Optionally, in this embodiment, the support plate 100 comprises a flat portion 11 and a bending portion 12 connected to at least one side of the flat portion 11, and the first region Q1, the second region Q2, and the hollow hole lk are arranged on the flat portion 11.

It should be noted that the support plate 100 of the present application may be a flat plate or a bending plate. This embodiment is described by taking with the support plate 100 comprising a flat portion 11 and a bending portion 12 as an example, but it is not limited to this.

Optionally, the openings kk comprise two first side lines and two oppositely provided second side lines, one of the first side lines is connected to one side of the two second side lines, and the first side lines are arcuate.

The first side lines have an arc-shaped design, which can better release stress and reduce a problem of stress concentration on mouth walls of the openings kk.

Optionally, the openings kk located in the straight edge region QA, i.e., first openings k1. The second side lines of the first opening k1 are straight side lines. The openings kk located in the bending region QB, i.e., second openings k2. The second side lines of the second openings k2 are arcuate side lines. Optionally, the first region Q1 comprises at least a straight edge region QA. There are four straight edge regions QAs, and the four straight edge regions QAs are arranged opposite to each other in pairs and surround a circumference of the hollow hole lk.

Figure 3:
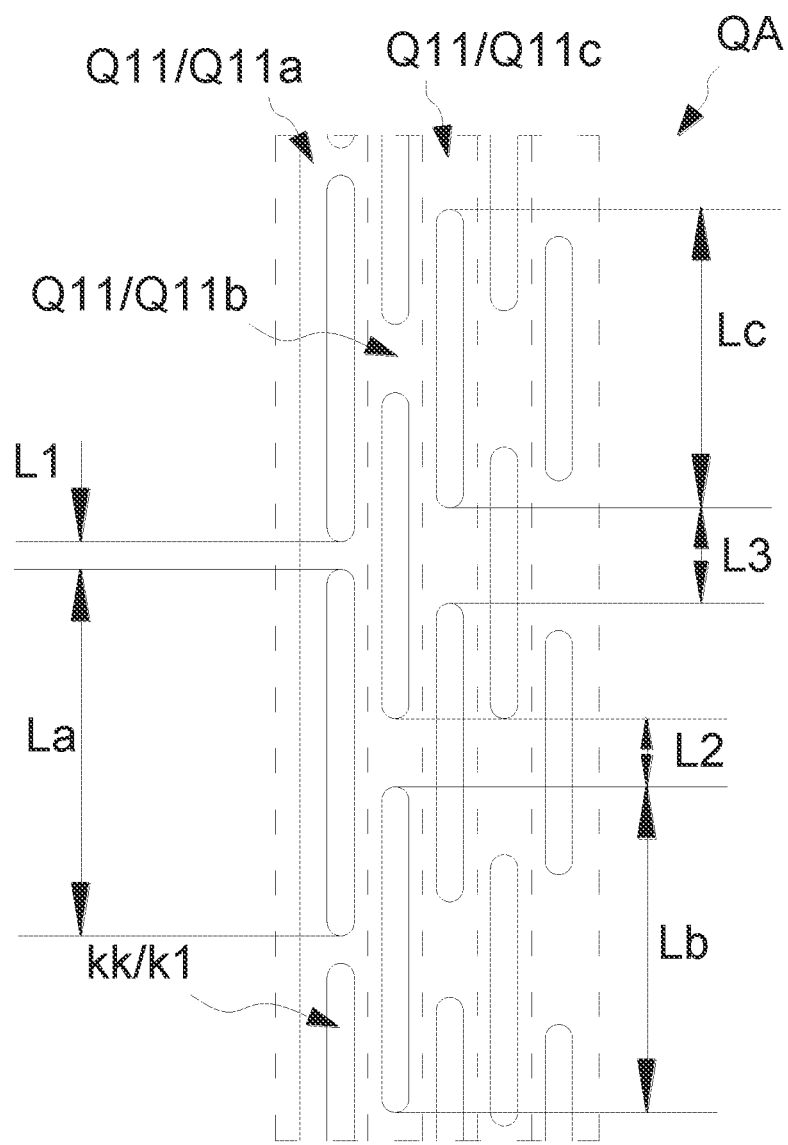
FIG. 3 is an enlarged view of part A of FIG. 2.

Referring to FIG. 3, the straight edge region QA comprises a plurality of straight edge sub-regions Q11. The plurality of straight edge sub-regions Q11 are arranged in sequence from an edge of the hollow hole lk in a direction away from the hollow hole lk, and rigidities of two adjacent straight-edge sub-regions Q11 increase gradually.

In this embodiment, the straight edge region QA in the first region Q1 is in a gradual manner, that is, which not only ensures support of a portion of the support plate 100 corresponding to the first region Q1, but also achieves the effect of releasing stresses. Further, the effect of improving imprints is also achieved on the basis of supporting the first region Q1.

Of course, in some embodiments, the rigidity corresponding to the straight edge region QA may be non-gradient, for example, rigidities corresponding to any two straight edge sub-regions Q11 may be equal or different.

Optionally, the plurality of openings kk comprise a first opening k1 arranged in the straight edge sub-region Q11. A length direction of the first opening k1 is an extension direction of the straight edge sub-region Q11; from an edge of the hollow hole lk in a direction away from the hollow hole lk, in any two of the straight edge sub-regions Q11, a length of the first opening k1 in the straight edge sub-region close to the hollow hole lk is greater than a length of the first opening k1 in the straight edge sub-region Q11 away from the hollow hole lk.

It can be understood that the greater the length of the first opening k1, the less the tensile modulus of the corresponding straight edge sub-region Q11, and thus the less the rigidity. The gradual change in rigidity in the straight edge region QA is thus achieved by a gradual change in the length of the first opening k1.

Optionally, the straight edge sub-region Q11 comprises at least a row of the first openings k1. In this embodiment, the straight edge sub-region Q11 comprising a row of the first openings k1 is taken as an example, but it is not limited to this.

Optionally, gradual change in the length of the first opening k1 may be reduced according to a set rule, which may be a same or a different first set ratio or first set value. For example, a first straight edge sub-region Q11a, a second straight edge sub-region Q11b, and a third straight edge sub-region Q11c are arranged in sequence from an edge of the hollow hole lk in a direction away from the hollow hole lk. A length La of the first opening k1 in the first straight edge sub-region Q11a is equal to a sum of a length Lb of the first opening k1 in the second straight edge sub-region Q11b and a first set value. A length Lb of the first opening k1 in the second straight edge sub-region Q11b is equal to a sum of a length Lc of the first opening k1 in the third straight edge sub-region Q11c and the first set value.

Or optionally, the length Lb of the first opening k1 in the second straight edge sub-region Q11b is equal to three-fourths of the length La of the first opening k1 in the first straight edge sub-region Q11a. The length Lc of the first opening k1 in the third straight edge sub-region Q11c is equal to three-fourths of the length Lb of the first opening k1 in the second straight edge sub-region Q11b.

The first set ratio and the first set value can be set and adjusted according to an actual situation, and details are not described here.

Optionally, from an edge of the hollow hole lk in a direction away from the hollow hole lk, in any two of the straight edge sub-regions Q11, a first spacing between the first openings k1 in the straight edge sub-region Q11 close to the hollow hole lk is less than a first spacing between the first openings k1 in the straight edge sub-region Q11 away from the hollow hole lk.

It can be understood that the greater the distance between the first spacings, the greater the tensile modulus of the corresponding straight edge sub-region Q11, and thus the greater the rigidity. Therefore, gradual change in rigidity in the straight edge region QA is achieved by the gradual change in width of the first spacing.

Optionally, the gradual change in width of the first spacing may be enlarged according to a set rule, which may be a same or a different second set ratio or second set value. For example, a sum of a width L1 of the first spacing in the first straight edge sub-region Q11a and a second set value is equal to a width L2 of the first spacing in the second straight edge sub-region Q11b. A sum of the width L2 of the first spacing in the second straight edge sub-region Q11b and the second set value is equal to a width L3 of the first spacing in the third straight edge sub-region Q11c.

Or optionally, three-fourths of the width L2 of the first spacing in the second straight edge sub-region Q11b is equal to the width L1 of the first spacing in the first straight edge sub-region Q11a. Three-fourths of the width L3 of the first spacing in the third straight edge sub-region Q11c is equal to the width L2 of the first spacing in the second straight edge sub-region Q11b.

The second set ratio and the second set value can be set and adjusted according to an actual situation, and details are not described here.

In this embodiment, the length of the first opening k1, and the distance between the first openings k1 and the first spacing are gradually changed at a same time, so that an effect of gradual change is improved, that is, the gradual change in rigidity is quickly realized in a limited region so as to shorten spaces of the straight edge region QA.

Optionally, in a direction parallel to a circumference of the hollow hole lk, the first openings k1 of each of the straight edge sub-regions Q11 are arranged at intervals, and the first spacing is provided between two adjacent first openings k1.

Wherein in any two of the straight edge sub-regions Q11, the length of the first opening k1 is equal to a sum of the first spacings.

That is, a sum of the length of the first opening k1 in one straight edge sub-region Q11 and the first spacing is equal to a sum of the length of the first opening k1 in another straight edge sub-region Q11 and the first spacing.

For example, length La+width L1=length Lb+width L2=length Lc+width L3.

In this embodiment, the sum of the length value of the first opening k1 and the width value of the first spacing are kept consistent, so that the rigidity of the straight edge sub-region Q11 is reduced regularly, the stress release effect and the smooth transition of support are improved, and the preparation efficiency can be improved.

In addition, in this embodiment, from an edge of the hollow hole lk in a direction away from the hollow hole lk, one of the first openings k1 in a row partially overlaps with two of the first openings k1 in an adjacent row.

That is, the first openings k1 in adjacent rows are staggered and partially overlapped, which improves uniformity of the stress release effect in the first region Q1.

Optionally, the first openings k1 in an odd-numbered rows are arranged in a row along an edge of the openings lk in a direction away from the openings lk, and center lines of the first openings k1 in each row coincide. At least a pattern of the two first openings k1 arranged in an even row on both sides of the center line is arranged symmetrically with respect to the center line.

Such an arrangement may further provide uniformity of rigidity in the first region Q1.

Optionally, in some embodiments, the straight edge sub-region Q11 may also comprise a plurality of rows of first openings k1. The plurality of rows of first openings k1 are arranged along edges of the openings lk in a direction away from the openings lk. In a straight edge sub-region Q11, two adjacent columns of first openings k1 are staggered. The lengths of the first openings k1 are equal and the spacings between two adjacent first openings k1 are also equal in a same straight edge sub-region Q11.

Of course, in some embodiments, the lengths of the first openings k1 may be different or partially equal in the same straight edge sub-region Q11; and the spacings between two adjacent first openings k1 may also be different or partially equal.

Optionally, referring to FIG. 2, the first region Q1 comprises at least a bending region QB.

In this embodiment, four bending regions QB are arranged in the four corner regions of the hollow hole lk, and one bending region QB is connected between the two straight edge regions QA. The bending region QB and the straight edge region QA are connected in sequence to surround the circumference of the hollow hole lk.

Figure 4:
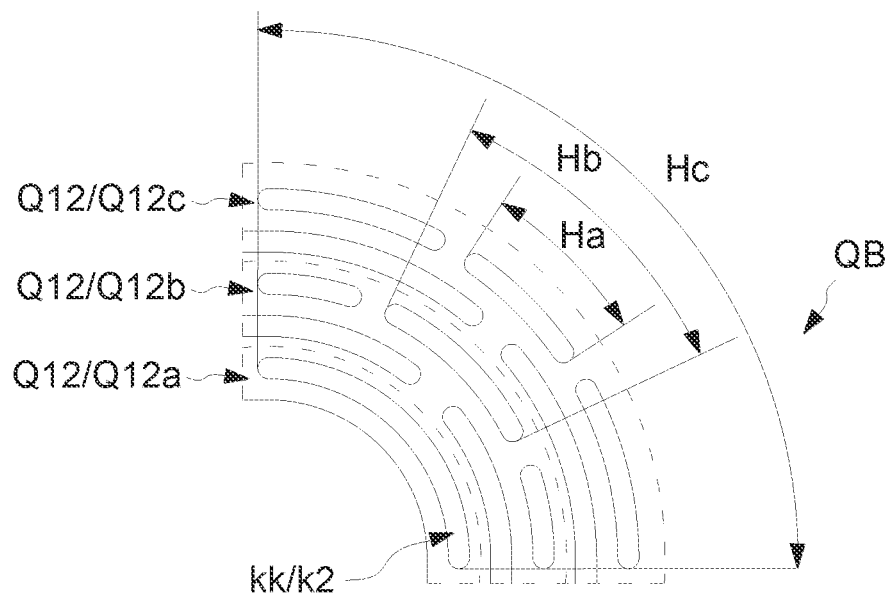
FIG. 4 is an enlarged view of a bending region of FIG. 2.

Optionally, referring to FIG. 4, the bending region QB comprises a plurality of bending sub-regions Q12; and the first region Q1 can further comprise a plurality of bending sub-regions Q12. In the first region Q1, the plurality of the bending sub-regions Q12 are arranged in sequence from an edge of the hollow hole lk in a direction away from the hollow hole lk, and rigidities of two adjacent bending sub-regions Q12 increase gradually.

In the present embodiment, the bending region QB in the first region Q1 is in a gradual manner, that is, which not only ensures support of a portion of the support plate 100 corresponding to the first region Q1, but also achieves the effect of releasing stresses. Further, the effect of improving imprints is also achieved on the basis of supporting the first region Q1.

Of course, in some embodiments, the rigidity corresponding to the bending region QB in the first region Q1 may be non-gradient, for example, rigidities corresponding to any two bending region Q12 may be equal or different.

Optionally, the plurality of openings kk comprise a second opening k2 arranged in the bending sub-region Q12. An arc length direction of the second opening k2 is an extension direction of the bending sub-region Q12. From an edge of the hollow hole lk in a direction away from the hollow hole lk, in any two of the bending sub-regions Q12, an arc length of second opening k2 in the bending sub-region Q12 close to the hollow hole lk is greater than an arc length of the second opening k2 in the bending sub-region Q12 away from the hollow hole lk.

It can be understood that the greater the arc length of the second opening k2, the smaller the tensile modulus of the corresponding bending sub-region Q12, and thus the smaller the rigidity. Gradual change in rigidity in the first region Q1 is thus achieved by the gradual change in the arc length of the second opening k2.

Optionally, the bending sub-region Q12 comprises at least a row of the second openings k2. In this embodiment, the bending sub-region Q12 comprising a row of the second openings k2 is taken as an example, but it is not limited thereto.

Optionally, the gradual change in the arc length of the second opening k2 may be reduced according to a set rule, which may be the same or a different third set ratio or third set value. For example, a first bending sub-region Q12a, a second bending sub-region Q12b, and a third bending sub-region Q12c are arranged in sequence from an edge of the hollow hole lk in a direction away from the hollow hole lk. An arc length Ha of the second opening k2 in the first bending sub-region Q12a is equal to a sum of an arc length Hb of the second opening k2 in the second bending sub-region Q12b and a third set value. An arc length Hb of the second opening k2 in the second bending sub-region Q12b is equal to a sum of an arc length Hc of the second opening k2 in the third bending sub-region Q12c and the third set value.

Or optionally, the arc length Hb of the second opening k2 in the second bending sub-region Q12b is equal to three-fourths of the arc length Ha of the second opening k2 in the first bending sub-region Q12a. The arc length Hc of the second opening k2 in the third bending sub-region Q12c is equal to three-fourths of the arc length Hb of the second opening k2 in the second bending sub-region Q12b.

The third set ratio and the third set value can be set and adjusted according to an actual situation. For example, the third set value may be an arc length of 5 degrees, 10 degrees, or 15 degrees.

Optionally, any two second openings k2 are arranged at a same dot.

Figure 5:
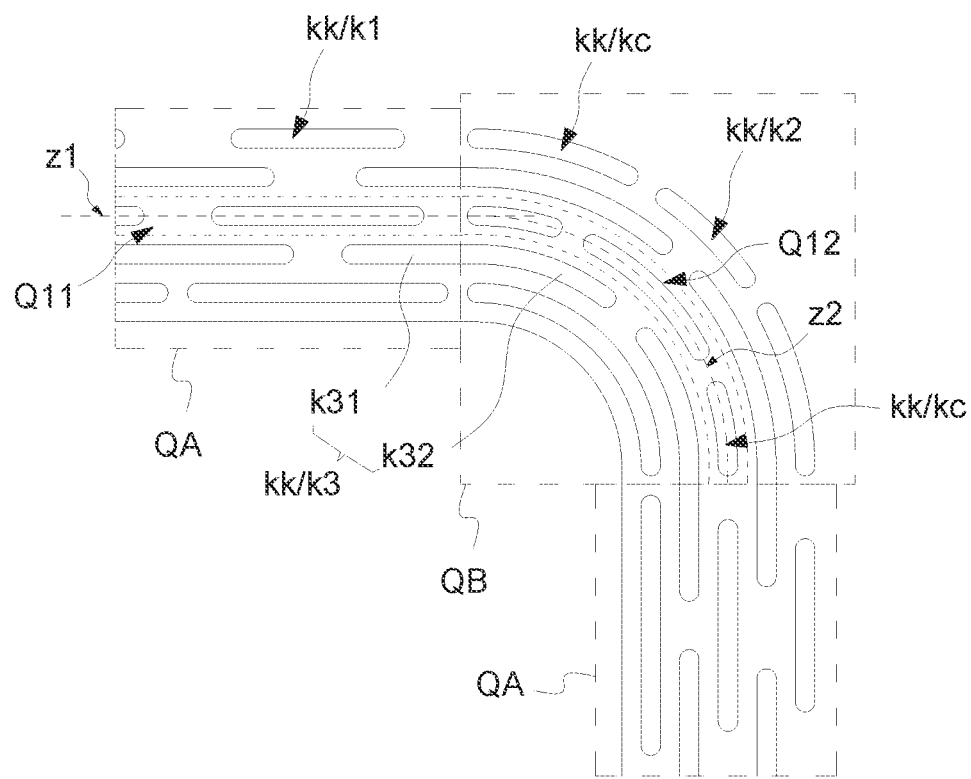
FIG. 5 is an enlarged view of part B of FIG. 2.

Referring to FIG. 5, optionally, the plurality of openings kk further comprises a compensation opening kc arranged between the first opening k1 and the second opening k2, and the compensation opening kc is arranged in the bending region QB.

An arc radius of the compensation opening kc is equal to an arc radius of the second opening k2 in a same bending sub-region Q12.

A distance from the compensation opening kc to the first opening k1 is greater than a distance from the compensation opening kc to the second opening k2 in a direction parallel to an edge of the hollow hole lk. This arrangement can improve uniformity of stress release in the bending region QB.

It can be understood that the first region Q1 comprises at least a straight edge region QA. The straight edge region QA comprises a plurality of straight edge sub-regions Q11. The plurality of openings kk comprise a first opening k1 arranged in the straight edge sub-region Q11.

The plurality of straight edge sub-regions Q11 are arranged in sequence from an edge of the hollow hole lk in a direction away from the hollow hole lk, and one of the straight edge sub-regions Q11 is correspondingly connected to one of the bending sub-regions Q12.

The plurality of openings kk comprise a third opening k3. The third opening k3 comprises a first portion k31 and a second portion k32 that are connected, and the first portion k31 is arranged in the straight edge region QA and the second portion k32 is arranged in the bending sub-region QB.

An extension direction of the first portion k31 coincides with an extension direction of the first opening k1 in a circumferential direction parallel to the hollow hole lk, and a radian direction of the second portion k32 is parallel to a radian direction of the second opening k2.

The third opening k3 is arranged between the first opening k1 and the second opening k2, which has an effect of buffering the straight edge sub-region Q11 and the bending sub-region Q12, thereby improving uniformity of the stress release of the first region Q1.

Optionally, the plurality of bending sub-regions Q12 are concentrically arranged, and a center angle of the plurality of bending sub-regions Q12 is 90 degrees; and a center line z1 of the straight edge sub-region Q11 is tangent to a center line z2 of the bending sub-region Q12 connected to the straight edge sub-region Q11.

Specifically, referring to FIG. 5, the center lines z2 of the plurality of the bending sub-regions Q12 are also concentrically arranged. In the same straight edge sub-region Q11, the center line z1 coincides with the center line of the first opening k1. In the same bending sub-region Q12, the center line z2 coincides with the center line of the second opening k2.

In a straight edge sub-region Q11 and a bending sub-region Q12 connected thereto, the center line z1 is just tangent to the center line z2 of the bending sub-region Q12. Meanwhile, the center line of the first opening k1 is also tangent to the center line of the second opening k2.

Optionally, referring to FIG. 1, in this embodiment, the support plate 100 comprises a flat portion 11 and a bending portion 12 connected to at least one side of the flat portion 11. The first region Q1, the second region Q2, and the hollow hole lk are arranged in the flat portion 11.

The support plate 100 is further provided with a third region Q3 corresponding to the bending portion 12. The plurality of openings kk further comprise a fourth opening k4, and a plurality of the fourth openings k4 are arranged in the third region Q3.

A rigidity of the bending portion 12 of the support plate 100 corresponding to the third region Q3 is less than a rigidity of the flat portion 11 of the support plate 100 corresponding to the second region Q2.

It should be noted that, when the support plate 100 is used to support a display panel with bending surfaces on both sides, the both sides of the display panel are bending surfaces, and the display panel has a greater stress due to bending, it is necessary that the bending portion 12 of the support plate 100 has a corresponding stress release capability. Therefore, the above arrangement improves the stress release effect of the third region Q3, facilitates the bonding between the support plate 100 and the panel, and reduces the risk of indentation as well.

Figure 6:
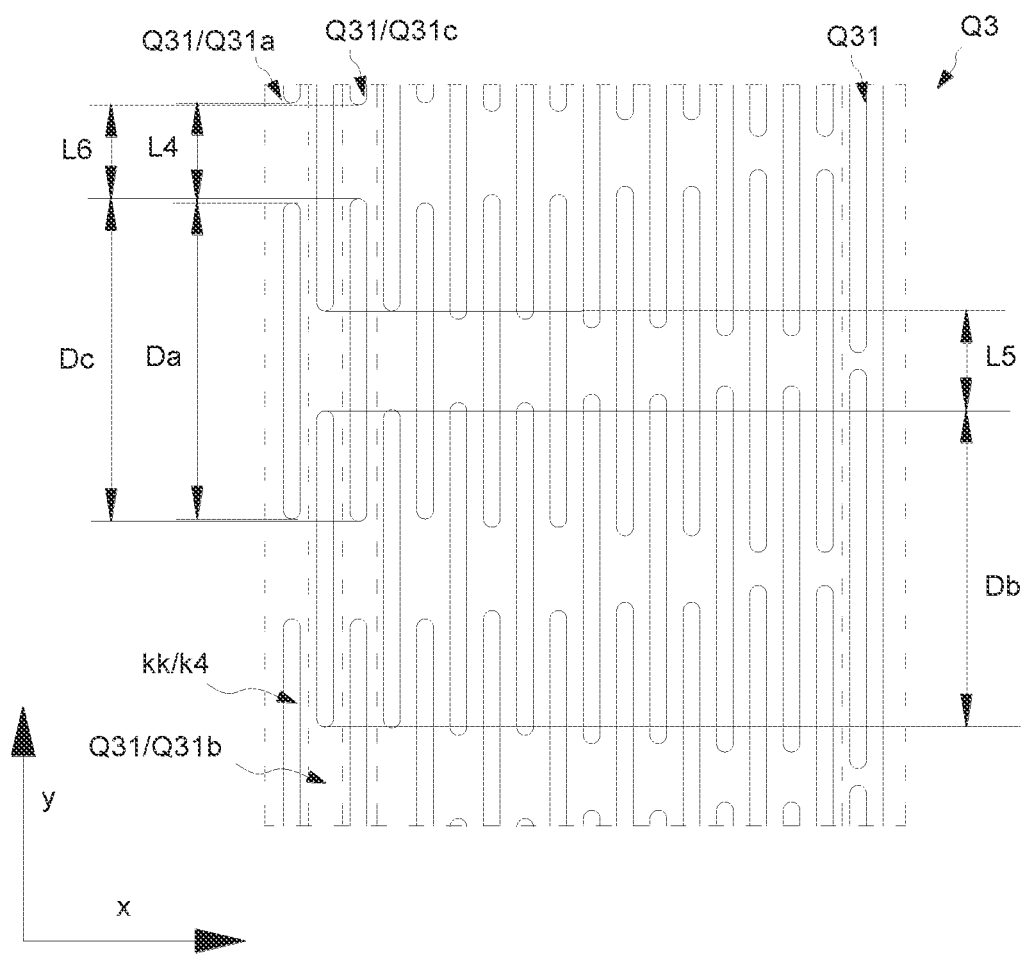
FIG. 6 is an enlarged view of part C of FIG. 1.

Optionally, referring to FIG. 6, the third region Q3 comprises a plurality of vertical sub-regions Q31. In the third region Q3, a plurality of vertical sub-regions Q31 are arranged in sequence in a direction from one side close to the second region Q2 to one side away from the second region Q2, and rigidities of two adjacent vertical sub-regions Q31 decreases.

When the support plate 100 is used to support a panel with bending surfaces on both sides, since the both sides of the panel are bending surfaces, the closer to an edge of the bending surfaces, the greater a bending degree, and the greater the stress caused by the bending of the panel. Therefore, in this embodiment, the stress of the support plate 100 is more balanced by adopting a gradual change method of decreasing rigidity, which not only facilitates the bonding between the support plate 100 and the panel, but also prolongs a service life of the support plate 100.

Of course, in some embodiments, the rigidity corresponding to the third region Q3 may be non-gradient, for example, rigidities corresponding to any two straight edge sub-regions Q11 are equal or different.

Optionally, a length direction of the fourth opening k4 is an extension direction of the third region Q3. In the third region Q3, a length of the fourth opening k4 increases in a direction from one side close to the second region Q2 to one side away from the second region Q2.

It can be understood that the greater the length of the fourth opening k4, the less the tensile modulus of the corresponding vertical sub-region Q31 is, and thus the less the rigidity is. The gradual change in rigidity in the third region Q3 is thus achieved by gradual change in the length of the fourth opening k4.

Optionally, the vertical sub-region Q31 comprises at least a row of the fourth openings k4. In this embodiment, the vertical sub-region Q31 comprising a row of the fourth openings k4 is taken as an example, but it is not limited to this.

Optionally, gradual change in the length of the fourth opening k4 may be enlarged according to a set rule, which may be the same or a different fourth set ratio or fourth set value. For example, a first vertical sub-region Q31a, a second vertical sub-region Q31b, and a third vertical sub-region Q31c are arranged in sequence in a direction from one side close to the second region Q2 to one side away from the second region Q2. A sum of a length Da of the fourth opening k4 in the first vertical sub-region Q31a and a fourth set value is equal to a length Db of the fourth opening k4 in the second vertical sub-region Q31b. A sum of a length Db of the fourth opening k4 in the second vertical sub-region Q31b and the fourth set value is equal to a length Dc of the fourth opening k4 in the third vertical sub-region Q31c.

Or optionally, four-fifths of the length Db of the fourth opening k4 in the second vertical sub-region Q31b is equal to the length Da of the fourth opening k4 in the first vertical sub-region Q31a. Four-fifths of the length Dc of the fourth opening k4 in the third vertical sub-region Q31c is equal to the length Db of the fourth opening k4 in the second vertical sub-region Q31b.

The fourth set ratio and the fourth set value can be set and adjusted according to an actual situation, and details are not described here.

Optionally, in any two vertical sub-regions Q31, a second spacing between the fourth openings k4 in the vertical sub-regions Q31 close to the second region Q2 is greater than a second spacing between the fourth openings k4 in the vertical sub-regions Q31 away from the second region Q2 in a direction from one side close to the second region Q2 to one side away from the second region Q2.

It can be understood that the greater the distance between the second spacings, the greater the tensile modulus of the corresponding vertical sub-region Q31, and thus the greater the rigidity. Therefore, gradual change in rigidity in the third region Q3 is thus achieved by the gradual change in width of the second spacing.

Optionally, the gradual change in width of the second spacing may be reduced according to a set rule, which may be the same or a different fifth set ratio or fifth set value. For example, a width L4 of the second spacing in the first vertical sub-region Q31a is equal to a sum of a width L5 of the second spacing in the second vertical sub-region Q31b and a fifth set value. The width L5 of the second spacing in the second vertical sub-region Q31b is equal to a sum of a width L6 of the second spacing in the third vertical sub-region Q31c and the fifth set value.

Or, optionally, three-fourths of the width L5 of the second spacing in the second vertical sub-region Q31b is equal to the width L4 of the second spacing in the first vertical sub-region Q31a. Three-fourths of the width L6 of the second spacing in the third vertical sub-region Q31c is equal to the width L5 of the second spacing in the second vertical sub-region Q31b.

The fifth set ratio and the fifth set value can be set and adjusted according to an actual situation, and details are not described herein.

In this embodiment, the length of the fourth opening k4 and the distance between the second spacings are gradually changed at a same time, so that an effect of gradual change is improved, that is, the gradual change in rigidity is quickly realized in a limited region so as to shorten space of the third region Q3.

Optionally, a plurality of vertical sub-regions Q31 are arranged in a first direction x. In each of the vertical sub-regions Q31, the fourth openings k4 are arranged at intervals in a second direction y. The first direction x is a bending direction of the bending portion 12. The second direction y is perpendicular to the first direction x.

In the second direction y, the second spacing is arranged between two of the adjacent fourth openings k4 in the same vertical sub-region Q31.

Wherein, in any two of the vertical sub-regions Q31, the length of the fourth opening k4 is equal to a sum of the second spacings.

That is, a sum of the length of the fourth opening k4 in a vertical sub-region Q31 and the second spacing is equal to a sum of the length of the fourth opening k4 in another vertical sub-region Q31 and the second spacing.

For example, length Da+width L4=length Db+width L5=length Dc+width L6.

In this embodiment, the sum of the length value of the fourth opening k4 and the width value of the second spacing is kept consistent, so that the rigidity of the vertical sub-region Q31 is reduced regularly, the stress release effect and the smooth transition of the support are improved, and the preparation efficiency can be improved.

Optionally, the vertical sub-region Q31 comprises at least a row of the fourth openings k4. One of the fourth opening k4 in a row partially overlaps with two of the fourth openings k4 in an adjacent row in the first direction x.

That is, the fourth openings k4 in adjacent rows are staggered and partially overlapped, which improves uniformity of the stress release effect in the third region Q3.

Optionally, in some embodiments, the vertical sub-region Q31 comprises a plurality of rows of fourth openings k4. The plurality of rows of fourth openings k4 are arranged in the first direction x. In a vertical sub-region Q31, two adjacent columns of fourth openings k4 are staggered. The lengths of the fourth openings k4 are equal, and the spacings between two adjacent fourth openings k4 are also equal in the same vertical sub-region Q31.

Of course, in some embodiments, the lengths of the fourth opening k4 may be different or partially equal in the same vertical sub-region Q31; and the spacings between two adjacent fourth openings k4 may also be different or partially equal.

Figure 7:
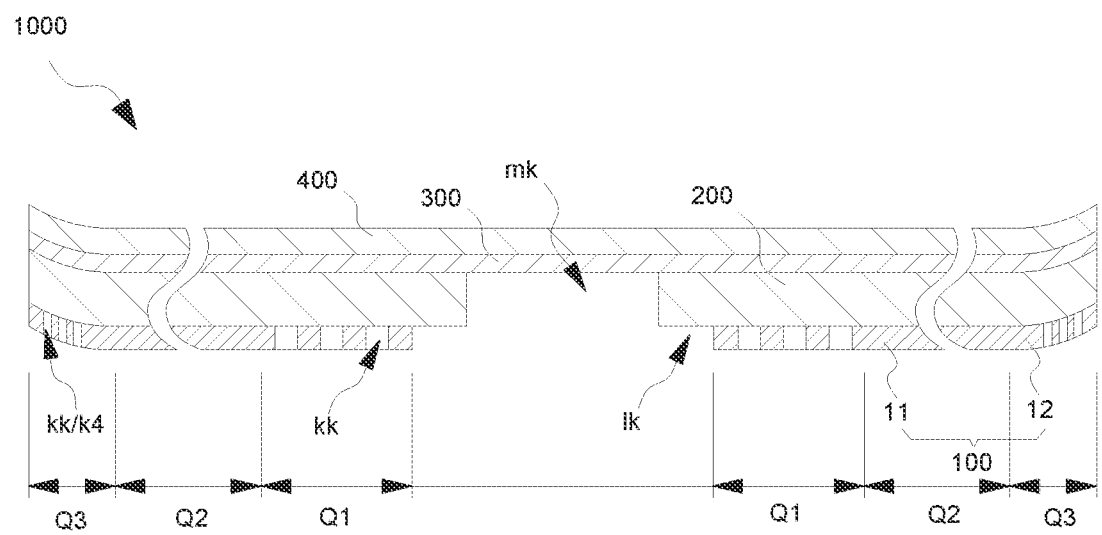
FIG. 7 is a schematic structural diagram of a display device provided by an embodiment of the present application.

Accordingly, referring to FIG. 7, an embodiment of the present application further provides a display device 1000, which comprises a support plate 100, a buffer layer 200, a colloid 300, and a display panel 400 according to any one of the above embodiments.

The buffer layer 200 is disposed on the support plate 100. The buffer layer 200 is provided with an opening mk corresponding to the openings 1k. The hole wall of the hollow hole 1k is located on an outer circumference side of the hole wall of the opening mk.

The colloid 300 is disposed on the buffer layer 200. The display panel 400 is disposed on the colloid 300.

It should be noted that the structure of the support plate 100 of the display device 1000 in this embodiment is similar to or same as that of the support plate 100 in any of the above embodiments. Please refer to the description of the support plate 100 of the above embodiments for details, which will not be repeated here.

In the display device 1000 of an embodiment of the present application, the support plate 100 is provided with a hollow hole 1k for providing an external module and a plurality of openings kk. The support plate 100 is provided with a first region Q1 and a second region Q2, and the plurality of openings kk are arranged in the first region. The first region Q1 is arranged on at least one side of the hollow hole 1k, and the second region Q2 is arranged on at least one side of the first region Q1 away from the hollow hole 1k. The rigidity of a portion of the support plate 100 corresponding to the first region Q1 is less than a rigidity of a portion of the support plate 100 corresponding to the second region Q2.

Wherein, the first region Q1 having the opening kk is provided on at least one side of the hollow hole 1k, and the rigidity of the first region Q1 is reduced by providing the opening kk, so that the stress release effect of the first region Q1 portion is improved during module compression, thereby reducing the risk of imprints around the hollow hole 1k on the support plate 100.

In addition, the arrangement that the hole wall of the hollow hole 1k is located at an outer circumference side of the hole wall of the opening mk can improve the stress release effect, thereby further buffering and reducing the imprints problem.

Optionally, the difference between the diameter of the hollow hole 1k and the diameter of the opening mk is between 1.2 mm and 3 mm, for example, 1.2 mm, 2 mm, or 3 mm.

The support plate and the display device provided by embodiments of the present application are described in detail above. In the present application, specific embodiments are applied to illustrate the principle and implementation of the present application, and the above embodiments are only used to help to understand the present application. At the same time, for those skilled in the art, there may be some variations in the specific implementation and application scope according to the ideas of the present application. In summary, the contents of the present specification should not be construed as limitations of the present application.

What is claimed is:

1. A support plate, wherein the support plate is provided with a hollow hole for providing an external module and a plurality of openings;
    the support plate is provided with a first region and a second region, the plurality of openings are arranged in the first region, the first region is arranged on at least one side of the hollow hole, and the second region is arranged on at least one side of the first region away from the hollow hole; and
    a rigidity of a portion of the support plate corresponding to the first region is less than a rigidity of a portion of the support plate corresponding to the second region.

2. The support plate according to claim 1, wherein the first region comprises at least a straight edge region, and the straight edge region comprises a plurality of straight edge sub-regions; the plurality of straight edge sub-regions are arranged in sequence from an edge of the hollow hole in a direction away from the hollow hole, and rigidities of two adjacent straight-edge sub-regions increase gradually.

3. The support plate according to claim 2, wherein the plurality of openings comprise a first opening arranged in the straight edge sub-region, and a length direction of the first opening is an extension direction of the straight edge sub-region; from an edge of the hollow hole in a direction away from the hollow hole, in any two of the straight edge sub-regions, a length of the first opening in the straight edge sub-region close to the hollow hole is greater than a length of the first opening in the straight edge sub-region away from the hollow hole.

4. The support plate according to claim 3, wherein from an edge of the hollow hole in a direction away from the hollow hole, in any two of the straight edge sub-regions, a first spacing between the first openings in the straight edge sub-region close to the hollow hole is less than a first spacing between the first openings in the straight edge sub-region away from the hollow hole.

5. The support plate according to claim 4, wherein in a direction parallel to a circumference of the hollow hole, the first openings of each of the straight edge sub-regions are arranged at intervals, and the first spacing is provided between two adjacent first openings; and
    wherein in any two of the straight edge sub-regions, the length of the first opening is equal to a sum of the first spacings.

6. The support plate according to claim 3, wherein the straight edge sub-region comprises at least a row of the first openings; from an edge of the hollow hole in a direction away from the hollow hole, one of the first openings in a row partially overlaps with two of the first openings in an adjacent row.

7. The support plate according to claim 1, wherein the first region comprises at least a bending region, and the bending region comprises a plurality of bending sub-regions; wherein in the first region, the plurality of the bending sub-regions are arranged in sequence from an edge of the hollow hole in a direction away from the hollow hole, and rigidities of two adjacent bending sub-regions increase gradually.

8. The support plate according to claim 7, wherein the plurality of openings comprise a second opening arranged in the bending sub-region, and an arc length direction of the second opening is an extension direction of the bending sub-region; wherein from an edge of the hollow hole in a direction away from the hollow hole, in any two of the bending sub-regions, an arc length of the second opening in the bending sub-region close to the hollow hole is greater than an arc length of the second opening in the bending sub-region away from the hollow hole.

9. The support plate according to claim 8, wherein the first region comprises at least a straight edge region, and the straight edge region comprises a plurality of straight edge sub-regions; the plurality of openings comprise a first opening arranged in the straight edge sub-region;
the plurality of straight edge sub-regions are arranged in sequence from an edge of the hollow hole in a direction away from the hollow hole, and one of the straight edge sub-regions is correspondingly connected to one of the bending sub-regions;
the plurality of openings comprise a third opening, the third opening comprises a first portion and a second portion that are connected, the first portion is arranged in the straight edge region, and the second portion is arranged in the bending sub-region; and
an extension direction of the first portion coincides with an extension direction of the first opening in a circumferential direction parallel to the hollow hole, and a radian direction of the second portion is parallel to a radian direction of the second opening.

10. The support plate according to claim 9, wherein the plurality of bending sub-regions are concentrically arranged, and a center angle of the plurality of bending sub-regions is 90 degrees; and a center line of the straight edge sub-region is tangent to a center line of the bending sub-region connected to the straight edge sub-region.

11. The support plate according to claim 1, wherein the support plate comprises a flat portion, and a bending portion connected to at least one side of the flat portion; and the first region, the second region, and the hollow hole are arranged in the flat portion;
the support plate is further provided with a third region corresponding to the bending portion, the plurality of openings further comprise a fourth opening, and a plurality of the fourth openings are arranged in the third region; and
a rigidity of the bending portion of the support plate corresponding to the third region is less than a rigidity of the flat portion of the support plate corresponding to the second region.

12. The support plate according to claim 11, wherein the third region comprises a plurality of vertical sub-regions; and in the third region, a plurality of the vertical sub-regions are arranged in sequence in a direction from one side close to the second region to one side away from the second region, and rigidities of two adjacent vertical sub-regions decreases.

13. The support plate according to claim 12, wherein a length direction of the fourth opening is an extension direction of the third region; and in the third region, a length of the fourth opening increases in a direction from one side close to the second region to one side away from the second region.

14. The support plate according to claim 12, wherein in any two of the vertical sub-regions, a second spacing between the fourth openings in the vertical sub-regions close to the second region is greater than a second spacing between the fourth openings in the vertical sub-regions away from the second region in a direction from one side close to the second region to one side away from the second region.

15. The support plate according to claim 14, wherein a plurality of the vertical sub-regions are arranged in a first direction; in each of the vertical sub-regions, the fourth openings are arranged at intervals in a second direction; the first direction is a bending direction of the bending portion, and the second direction is perpendicular to the first direction; and
in the second direction, the second spacing is arranged between two of the adjacent fourth openings in the same vertical sub-region;
wherein, in any two of the vertical sub-regions, the length of the fourth opening is equal to a sum of the second spacings.

16. The support plate according to claim 14, wherein the vertical sub-region comprises at least a row of the fourth openings; and one of the fourth openings in a row partially overlaps two of the fourth openings in an adjacent row in the first direction.

17. The support plate according to claim 1, wherein the opening comprises two first side lines and two oppositely provided second side lines, one of the first side lines is connected to one side of the two second side lines, and the first side lines are arcuate.

18. A display device, comprising:
a support plate provided with a hollow hole for providing an external module and a plurality of openings; the support plate is provided with a first region and a second region, the plurality of openings are arranged in the first region, the first region is arranged on at least one side of the hollow hole, and the second region is arranged on at least one side of the first region away from the hollow hole; and a rigidity of a portion of the support plate corresponding to the first region is less than a rigidity of a portion of the support plate corresponding to the second region;
a buffer layer arranged on the support plate, wherein the buffer layer is provided with an opening corresponding to the hollow hole, and a hole wall of the hollow hole is located on an outer circumference side of a hole wall of the opening;
a colloid disposed on the buffer layer; and
a display panel disposed on the colloid.

19. The display device according to claim 18, wherein the first region comprises at least a straight edge region, and the straight edge region comprises a plurality of straight edge sub-regions; the plurality of straight edge sub-regions are arranged in sequence from an edge of the hollow hole in a direction away from the hollow hole, and rigidities of two adjacent straight-edge sub-regions increase gradually.

20. The display device according to claim 19, wherein the plurality of openings comprise a first opening arranged in the straight edge sub-region, and a length direction of the first opening is an extension direction of the straight edge sub-region; from an edge of the hollow hole in a direction away from the hollow hole, in any two of the straight edge sub-regions, a length of the first opening in the straight edge sub-region close to the hollow hole is greater than a length of the first opening in the straight edge sub-region away from the hollow hole.

\* \* \* \* \*